(No Model.)

C. VON GRABOWSKI.
PROCESS OF AND APPARATUS FOR PURIFYING SULFATE LYES.

No. 515,763.  Patented Mar. 6, 1894.

Witnesses:
Hugo L. Beil
Marie P. Barker

Inventor:
Carl von Grabowski
By Richards &
Attorneys

UNITED STATES PATENT OFFICE.

CARL VON GRABOWSKI, OF EISLEBEN, GERMANY.

PROCESS OF AND APPARATUS FOR PURIFYING SULFATE LYES.

SPECIFICATION forming part of Letters Patent No. 515,763, dated March 6, 1894.

Application filed July 15, 1893. Serial No. 480,657. (No model.)

*To all whom it may concern:*

Be it known that I, CARL VON GRABOWSKI, a subject of the Emperor of Germany, residing at Eisleben, Germany, have invented an Improved Process of and Apparatus for Purifying Sulfate Lyes, of which the following is a specification.

In order to render sulphate lye or liquor which contains free sulphuric acid suitable for being subsequently directly utilized, a series of processes requiring much trouble and work has been hitherto necessary, and thus the process of purifying the same rendered very difficult and expensive.

This invention has for its object the removal of these drawbacks, and is carried out as follows:

The sulphate lye is first subjected to a suitable concentrating process, and the then concentrated liquid is exposed to the action of an electric current of high strength, suitable anodes and cathodes being used, whereupon the arsenic and antimony still remaining therein are deposited on the cathodes in a reguline form or in the form of a metallic sulphide, so completely that the freed sulphuric acid contained in the sulphate lye, is again directly applicable for any suitable purpose. If it be a question, for instance, of the treatment of the active lye which is gradually charged with impurities in the course of the process for the electrolytic recovery of pure copper in the sulphate bath, such lye is converted, first by evaporation, and subsequently crystallization, into sulphate of copper. The mother liquor remaining from the crystallization of the sulphate of copper contained in the lye contains, in addition to free sulphuric acid and metallic sulphates, arsenic and antimony in considerable quantities, and is unsuitable for being directly purified by electrolysis. If this mother liquor, however, be suitably evaporated, the dehydrated sulphates are separated from the other metals contained in the liquor, and the lyes are then rendered suitable for electrolytical purification, or the separation of arsenic and antimony which remain in solution.

Figure 1:
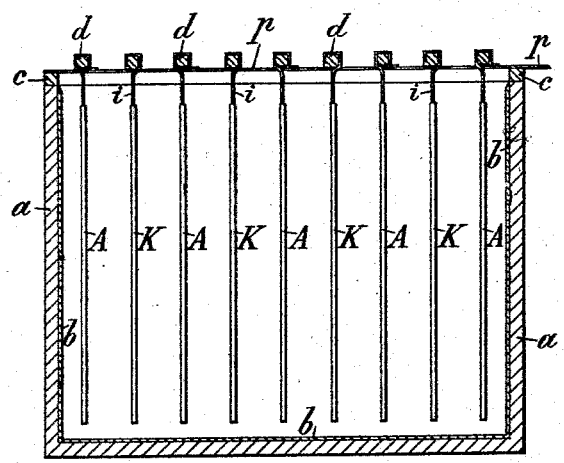
Figure 2:
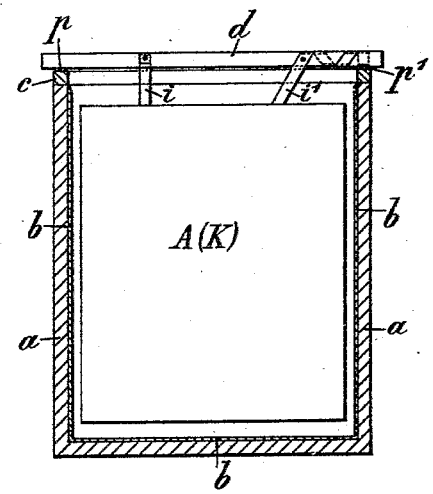
Figure 3:
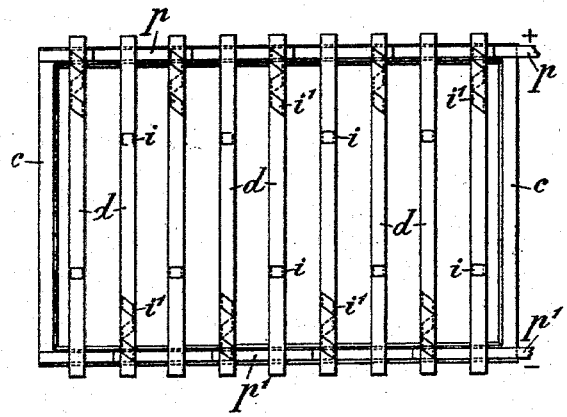

The process of purification is carried out in the following manner:—Sulphate lyes containing free sulphuric acid, which are rendered impure not only by the metallic sulphates but also by arsenic and antimony, are brought by evaporation, with a simultaneous deposition of the sulphates, to a specific gravity of about 52° Baumé, and are then subjected or exposed in cells or vessels of about one cubic meter capacity, to the action of an electric current of high strength (sixty to eighty ampères per square meter of anode surface) using anodes and cathodes of lead or copper. These cells or vessels are shown on the accompanying drawings—Figure 1 being a longitudinal section; Fig. 2, a cross section, and Fig. 3, a plan view thereof. Arsenic and antimony are thereupon deposited in a reguline form on the cathodes so that the lye entirely freed therefrom and purified is again directly available for any suitable purpose. If the concentration of the liquor attains more than 52° Baumé, the separation of arsenic and antimony takes place as metallic sulphides, because, under the action of the electric current, the free sulphuric acid is decomposed, causing the formation of sulphureted hydrogen. Arsenic and antimony, or their metallic sulphides, may then be obtained from the deposits on the cathodes by carefully washing off and drying in the usual known manner. The vessels employed for obtaining these metals electrolytically consist of a box $a$ formed of wood, which is lined inside with lead plates $b$ and afterward given a coat of asphalt. A wooden frame $c$ is placed on top on the sides of the box, the latter being provided on two sides with metal rails $p$ and $p'$, the first of which, $p$, is connected with the positive pole, and the second, $p'$, with the negative pole of a source of an electrical current of high strength.

A suitable number of cross bars $d$ of wood rest on the frame $c$ and project beyond the two guide rails $p$ and $p'$, and the electrodes A and K are suspended from these bars by means of strips $i$ and $i'$ of sheet copper, in such a way, however, that the strip $i$ of each electrode is merely intended to carry the same, while the strip of copper $i'$ of each electrode serves both for carrying the same and also for conveying or transferring the electric current from the guide rails $p$ and $p'$ to the electrodes. Each strip $i'$ is, for this purpose, connected at one end with its electrode, and the other end, which is wound several times round the bar $d$, is brought into connection with the positive or negative poles of the source of current, according as the electrode is used as anode or cathode. In the case of anodes, the strips of copper are coated with lead so far as they penetrate into the liquid.

On the accompanying drawings, each anode is marked A, and each cathode K.

Having now particularly described and ascertained the nature of my said invention and in what manner the same is to be performed, I declare that what I claim is—

1. An improved process for purifying or regenerating sulphate lyes or liquors containing free sulphuric acid, and, in addition to metallic sulphates, containing also arsenic, and antimony, which consists in evaporating the lye or liquor to a specific gravity of 52° Baumé and allowing the sulphates therein contained to crystallize out, and then expose it to the action of an electric current of high strength, using anodes and cathodes of lead or copper, with the object of entirely separating out the arsenic and antimony, and recovering the free sulphuric acid contained in the sulphate liquor, substantially as described.

2. An apparatus consisting of a box or case $a$, having a lining $b$, current-conducting bars or rails $p$ and $p'$, and bars $d$, from which bars electrodes are suspended by means of metal strips $i$ and $i'$, such metal strips being so arranged that each anode A is in connection by means of a strip $i'$ with the positive pole, and each cathode K by means of a strip $i'$ with the negative pole of the source of current, substantially as described.

CARL VON GRABOWSKI.

Witnesses:
CARL BORNGRAEBER,
MORITZ SCHULZ.